(12) United States Patent
Breau et al.

(10) Patent No.: US 7,774,316 B2
(45) Date of Patent: Aug. 10, 2010

(54) FILESYSTEM SNAPSHOT ENHANCEMENT TO IMPROVE SYSTEM PERFORMANCE

(75) Inventors: Robert Breau, Newburyport, MA (US); Timothy Mark, Goffstown, NH (US)

(73) Assignee: Oracle International Corp., Redwood Shores, CA (US)

( * ) Notice: Subject to any disclaimer, the term of this patent is extended or adjusted under 35 U.S.C. 154(b) by 622 days.

(21) Appl. No.: 11/292,095

(22) Filed: Dec. 2, 2005

(65) Prior Publication Data

US 2007/0130228 A1 Jun. 7, 2007

(51) Int. Cl.
*G06F 17/00* (2006.01)
(52) U.S. Cl. .................................... 707/652
(58) Field of Classification Search ............... 707/1–10, 707/100–104.1, 200–206
See application file for complete search history.

(56) References Cited

U.S. PATENT DOCUMENTS

| | | | |
|---|---|---|---|
| 2004/0078467 A1* | 4/2004 | Grosner et al. | 709/226 |
| 2004/0250031 A1* | 12/2004 | Ji et al. | 711/162 |
| 2004/0268177 A1* | 12/2004 | Ji et al. | 714/6 |
| 2005/0027956 A1* | 2/2005 | Tormasov et al. | 711/162 |
| 2005/0240756 A1* | 10/2005 | Mayer | 713/2 |
| 2007/0179995 A1* | 8/2007 | Prahlad et al. | 707/202 |
| 2007/0185914 A1* | 8/2007 | Prahlad et al. | 707/200 |

* cited by examiner

*Primary Examiner*—Diane Mizrahi
(74) *Attorney, Agent, or Firm*—Kraguljac & Kalnay, LLC (57) ABSTRACT

Reducing copy on write activity during snapshot backup processing in computer system. A snap shot of the data is created. As the backup of each file is successfully completed, the copy-on-write functionality for the file is disabled. As the backup of each other file is successfully completed, the copy-on-write for each other file is disabled.

11 Claims, 9 Drawing Sheets

FILESYSTEM SNAPSHOT ENHANCEMENT TO IMPROVE SYSTEM PERFORMANCE

BACKGROUND OF THE INVENTION

1. Field of the Invention

The present invention is generally related to data and file storage systems and in particular to snapshot technology in file system backup.

2. Brief Description of Related Developments

Snapshot technology is currently supported in most File systems. Snapshots provide a stable and consistent image of a file system at a specific point in time. One of the major challenges with snapshot technology is the need to handle file system changes once the snapshot has been created. All file system changes must be included in the original file system, but they cannot appear in any corresponding snapshots. This is often done via Copy On Writes (COW) which requires additional IO and disk space to allow for file system changes while maintaining the snapshot image. One of the major consumers of snapshot technology is file system backup. Snapshots present a consistent file system for backup purposes, but often at a significant cost in terms of performance and disk space utilization. All changes require additional IO and disk space to maintain multiple versions of data that changed. This includes user data and metadata.

Current snapshot-backup processing requires COW activity for all file system changes for the duration of the entire backup process, which can be expensive in terms of I/O, CPU cycles, and disk space consumption.

It would be advantageous to be able to reduce COW activity during the snapshot backup process. It would also be advantageous to be able to minimize COW activity if backup prioritization were implemented. This would significantly reduce 10 and disk space consumption for active file systems. The more active the file system, the greater the benefit this would provide. Overall backup, file system and system performance would improve. These advantages also hold true for other applications as well, such as for example, on-line file system verification.

SUMMARY OF THE INVENTION

In one aspect, the present invention is directed to a method and system for maintaining snapshot information in a computer system. In one embodiment, the method includes generating a snap shot of data, and initiating a backup of the data by duplicating the data and storing the duplicated data to a backup storage location. After completing the backup of a first file in the data, the copy-on-write functionality for the first file is disabled. As the backup of each file in the data continues, the copy-on-write functionality for each file is disabled as soon as the backup for the file or portion thereof is completed.

In another aspect, the present invention is directed to a method of managing data in a data storage system. In one embodiment, the method includes creating a snapshot of the system as of a predetermined point in time. A list of files is identified that are not relevant for a backup of the data storage system. The copy on write functionality for each of these files is disabled. A backup routine is run on the data storage system. If not previously disabled, the copy on write functionality for each file that is backed up is disabled after the backup for that file is complete.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT(s)

Figure 1:
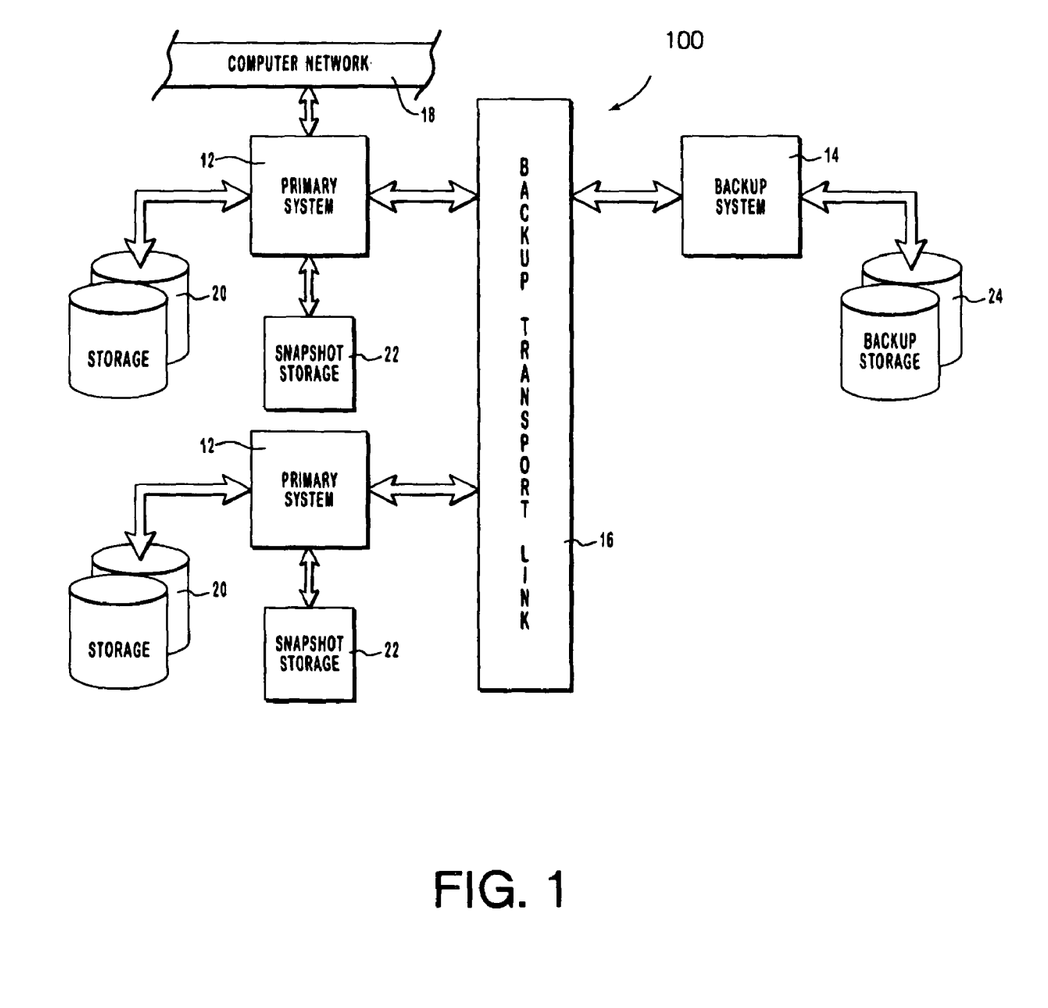
FIG. 1 is a block diagram of one embodiment of a system incorporating features of the present invention.

Referring to FIG. 1, a perspective view of a system 100 incorporating features of the present invention is illustrated. Although the present invention will be described with reference to the embodiment shown in the drawings, it should be understood that the present invention can be embodied in many alternate forms of embodiments. In addition, any suitable size, shape or type of elements or materials could be used.

FIG. 1 illustrates a system level block diagram of one embodiment of the present invention. The system 100 can include one or more primary systems 12, at least one backup system 14, and backup transport means for transporting data between primary system 12 and backup system 14. The backup transport means is illustrated as backup transport link 16. The primary system 12 may be any type of networked or stand alone computer system, including a data warehouse or database system. For example, primary system 12 may be a network server computer connected to a computer network such as computer network 18. Primary system 12 may also be a stand alone system. Primary system 12 may also be a backup or standby server of a computer network connected to a primary server. The present invention can be used with any type of computer system. The term "primary", as is used herein, is not meant to define or describe a computer system as a primary network server (as opposed to a backup or standby network server), but rather to refer to the fact that the system has attached storage means for storing a copy of the data that is to be backed up.

Snapshots or snapshotting, as the terms are commonly understood, generally comprises the creation of a consistent picture of the blocks of data in a file system such as primary system 12, or other data facility as of a certain point in time. Copy on Write operations are implemented and carried out in order to maintain the integrity of the snapshot until the snapshot is deleted.

Figure 2:
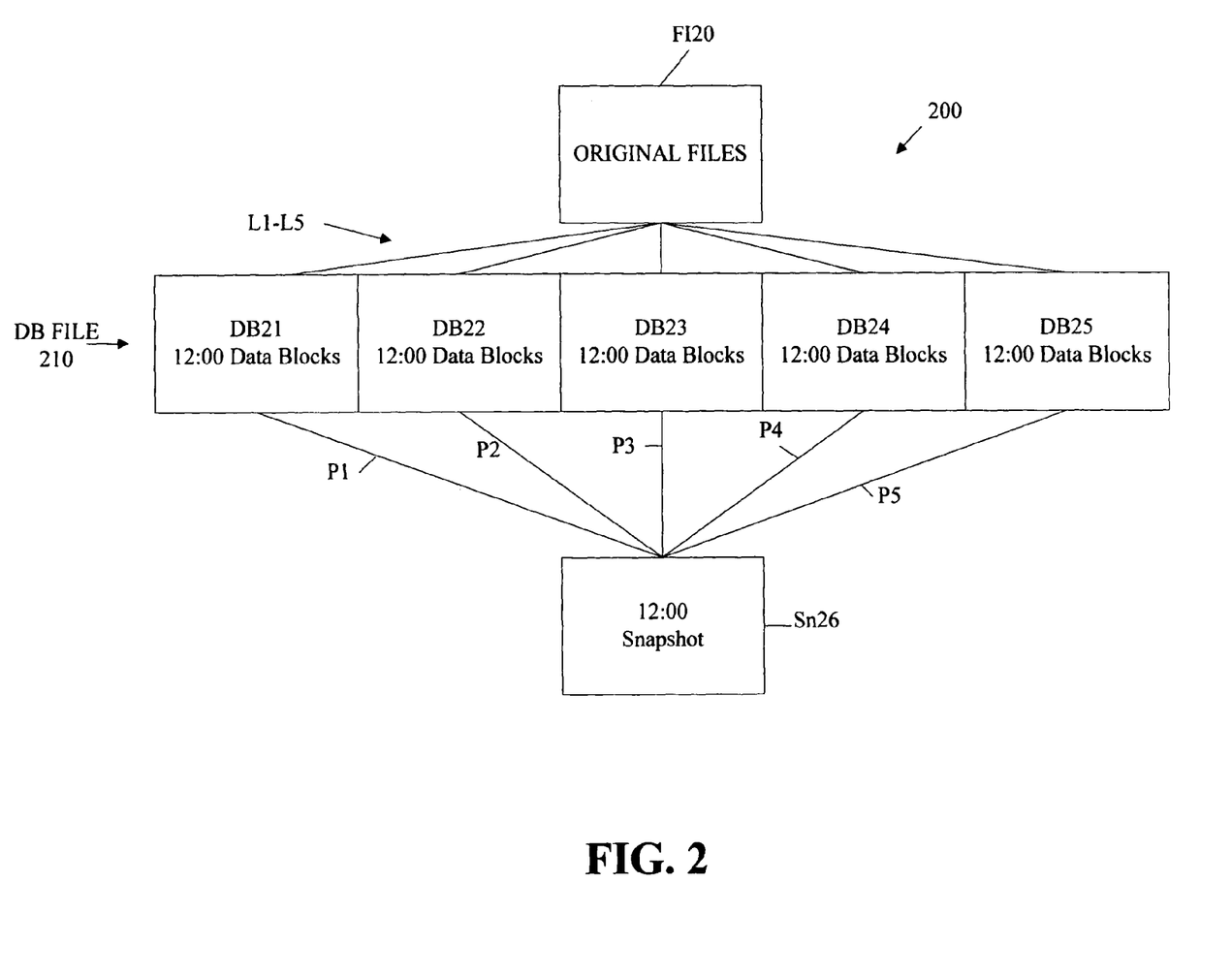
FIG. 2 is a block diagram of one embodiment of a data storage system incorporating features of the present invention.

For example, referring to FIG. 2 a snapshot 26 is created for backup purposes. File 20 is being updated while the backup is being performed so all changes to File 20 require additional COW IO and disk space to maintain a consistent snapshot image of File 20. This COW activity for File 20 continues until the snapshot has been deleted, usually once the entire backup process completes. In one embodiment, the features of the present invention disable COW activity for File 20 once it has been successfully backed up, thus reducing overall IO and disk space consumption. In addition, backup prioritization can be implemented so that the most active files in terms of updates would be processed first to minimize COW activity during the backup process. The features of the present invention could also be used for on-line file system verification where snapshots are utilized to check for file system consistency For example, referring to FIG. 1, during a backup operation in backup system 14 of the primary system 12, the system 10 can disable Copy on Write operations, on-the-fly for an entire file, or range of bytes within a file, stored in the primary system 12. Generally, once the application, such as the backup application 14, knows that it no longer needs a consistent image of the file, or range of bytes within a file, the Copy on Write operations for that file or range of bytes within that file, stored in the Snapshot Storage 22, can be disabled. This reduces the overhead associated with maintaining snapshot images and Copy on Write operations.

As shown in FIG. 1. the primary system 12 is connected to a storage device or system 20 and snapshot storage 22. Storage device 20 and Snapshot storage 22 can be within the same storage facility or system. The storage device or system 20 is for storing a plurality of data blocks from the primary system 12 in one or more storage locations. The term "data block" will be used to describe a block of data that is written to or read from storage device 20. The term "data block" is intended to be broadly construed and should include any size or format of data. For example, the data stored in an individual sector on a disk is properly referred to as a data block. The amount of data stored in a group or cluster of sectors may also properly be referred to as a data block. If the storage device 20 is a RAM or other word or byte addressable storage device, the term data block may be applied to a byte, a word, or multiple word unit of data.

The disclosed embodiments use a static snapshot of all or part of the storage device 20 during the backup process and snapshot storage 22 generally comprises a memory device for storing data blocks or files of the storage device 20 to create a static snapshot of the storage device 20 at a particular point in time. The snapshot storage device or system 22 can include any suitable type of writable storage device such as RAM, EEPROM, or magnetic disk storage. The snapshot storage device 22 can also be a portion of the storage device 20.

The backup system 14 of FIG. 1 generally comprises backup storage 24 for storing data blocks and files that received from the primary system 12. The backup storage device 24 can include any type of storage device capable of storing blocks of data received from a primary system. For example, the backup storage device 24 could include a storage device identical to the storage device of the primary system 12. In one embodiment, the backup storage facility 24 may not be separate from the primary facility 12. If the backup storage device 24 is the same as, or serves as, the storage device of the primary system 12, the backup storage system or device 24 can closely mirror the storage device 20 of the primary system 12. The type of storage devices that may be used for backup storage is limited only by the particular application where they are utilized.

In one embodiment, in order to transfer data between the primary system 12 and backup system 14, a backup transport link 16 can be used. In alternate embodiments, any suitable system and method can be used to transfer data between the primary system 12 and the backup system 14. The backup transport link 16 may comprise any combination of hardware and/or software needed to allow data communications between the primary system 12 and the backup system 14. For example, backup transport link 16 may be a local area network (LAN), a wide area network (WAN), a dial-up connection using standard telephone lines or high speed communication lines, the internet, or any other mechanism that allows data to flow between the primary system 12 and the backup system 14.

Referring to FIG. 2, one embodiment of a system 200 incorporating features of the present invention is illustrated. The system 200 generally comprises a file system 20 or other data and information storage facility, such as for example a database. The system 200 shown in FIG. 2 generally includes files 21-25 which store or hold data and information. In alternate embodiments, the original files 20 can include any suitable number or size of files. If a "snapshot" 26 is taken of the original files 20 of the system 200 as of a certain point in time, the data is shown stored in files 21-25. In this example shown in FIG. 2, a snapshot 26 of the files 20 is taken as of 12:00. This creates a "SNAPSHOT" file system 26, which generally includes "pointers" P1-P5, that "point" to the actual location where the data resides. The snapshot 26 provides a view to the way the data files 21-25 appeared at 12:00.

Figure 3:
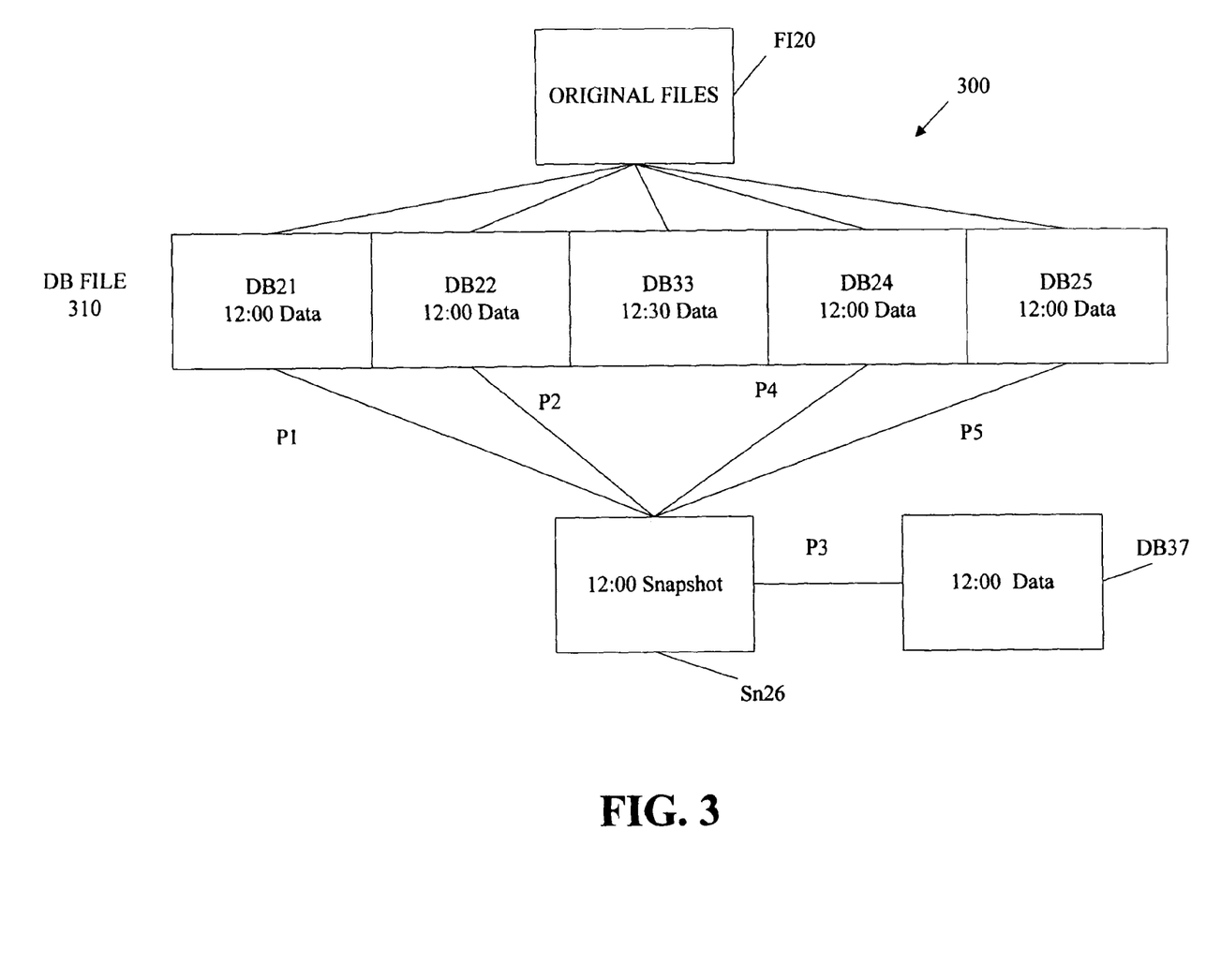
FIG. 3 is a block diagram of one embodiment of a data storage system incorporating features of the present of the present invention after a WRITE operation.
Figure 4:
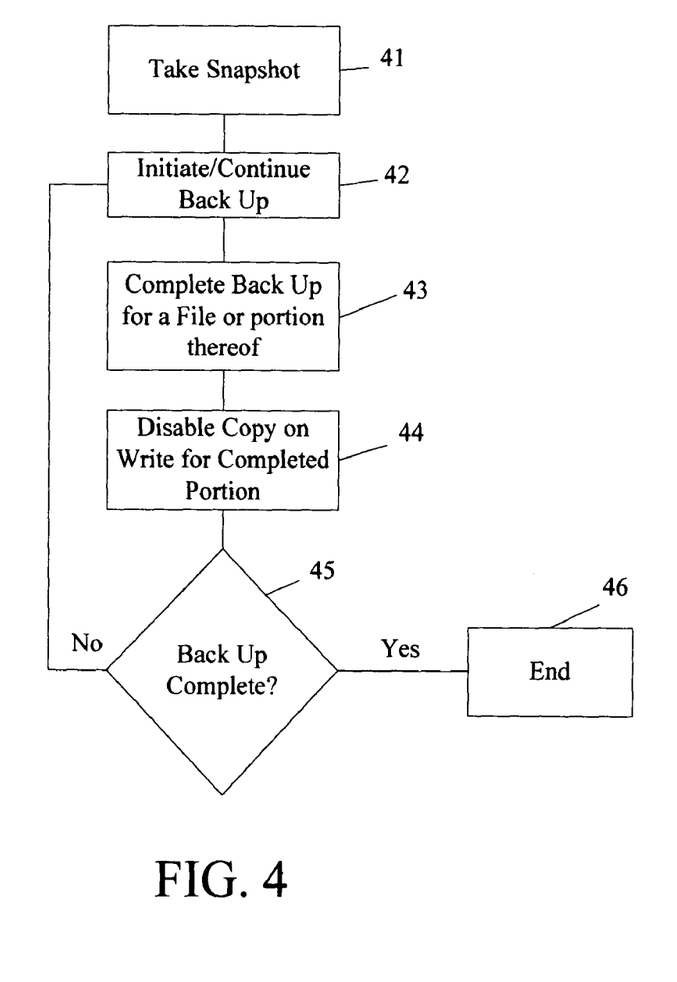
FIG. 4 is a flow chart illustrating one embodiment of a method incorporating features of the present invention.

Referring to FIG. 3, if, in the system 200 of FIG. 2, a change is attempted to be made file 23, and Copy On Write enabled, this results in the original 12:00 data from location 23 being copied to another or new storage location, shown as 37 in FIG. 3. Before a WRITE operation occurs with respect to data block 23 of FIG. 2, the data from block 23 is copied to the new storage location 37 and the pointer P3 is changed to point to the new location 37. The data in block 23 can then be overwritten with the new data, now referred to as 12:30 data in block 33. The pointer P3 of FIG. 2, now points, in FIG. 3, to the data block 37. This Copy On Write process, which otherwise remains active during the entire backup process, requires the allocation of additional storage, copying of data files and the changing of pointers. However, in order to reduce the overhead associated with this Snapshot and Copy on Write process, the disclosed embodiments allow the Copy on Write functionality for a file or range of bytes within a file or files, to be disabled as the backup process progresses, Referring to FIG. 4, one embodiment of a method incorporating features of the present invention is illustrated. In Applicant's invention, a snapshot 41 is taken of the original files, as of a certain point in time, which in the example related to FIGS. 2 and 3, was 12:00. As noted previously, the snapshot 26 shown in FIG. 2 has pointers P1-P5 that point to the location of the original data as of 12:00, shown in locations 21-25. After the snapshot is taken, the backup of the system 20 commences 42. As the backup of the files or data 21-25 of FIG. 2 proceeds, the system 200 determines when the backup of a certain file(s) or portion(s) thereof is complete. A file can comprise any number of bytes, and some files can be in the terabyte range. The disclosed embodiment can backup a file as a whole, and can also segment a file into ranges of bytes. The system 200 notifies the file system that the backup for the data in a file or range of a file is complete 43. Once this backup is complete, the system 200 will disable 44 the Copy on Write capability for that file or range of a file. Thus, any subsequent update to that data block is ignored, from a snapshot perspective. The system determines 45 if the backup is complete. If not complete, the backup process is continued. If the backup of the original files 20 is complete, then the process ends 46 and the snapshot 26 can be discarded or deleted. In one embodiment, an API into the file system tells the file system 45 that the backup for a file, range of files or block of data is complete and that copy-on-write can be disabled respectively.

Figure 6:
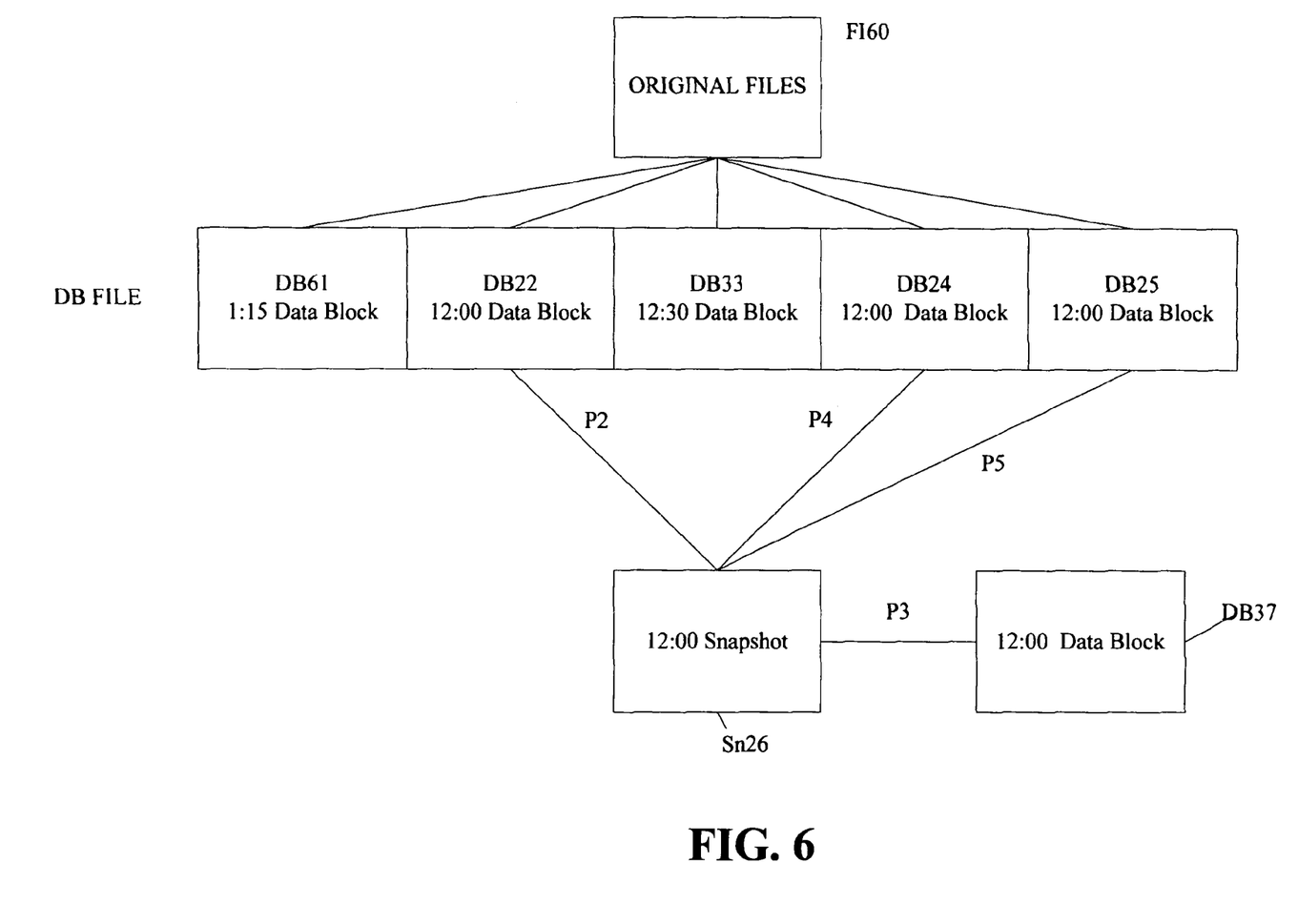
FIG. 6 is a block diagram of one embodiment of a system incorporating features of the present invention illustrating the occurrence of a WRITE operation after copy-on-write is disabled.

For example, referring to FIGS. 2 and 6, the snapshot 26 includes the view of the system as it appeared at 12:00, and at 12:00, the backup of the original files 20 commences. Once the backup of data block 21 is complete, at for example 1:00, the system is notified that the backup is complete, and the Copy on Write capability is disabled for block 21. If a change is attempted to be made to block 21 subsequent to 1:00, say for example 1:15, the WRITE operation to that block 26 is enabled, and the change to that block occurs without any Copy on Write. Referring to FIG. 6, the block 61 holds the 1:15 data and the snapshot 26 does not include a pointer to block 61.

Figure 5:
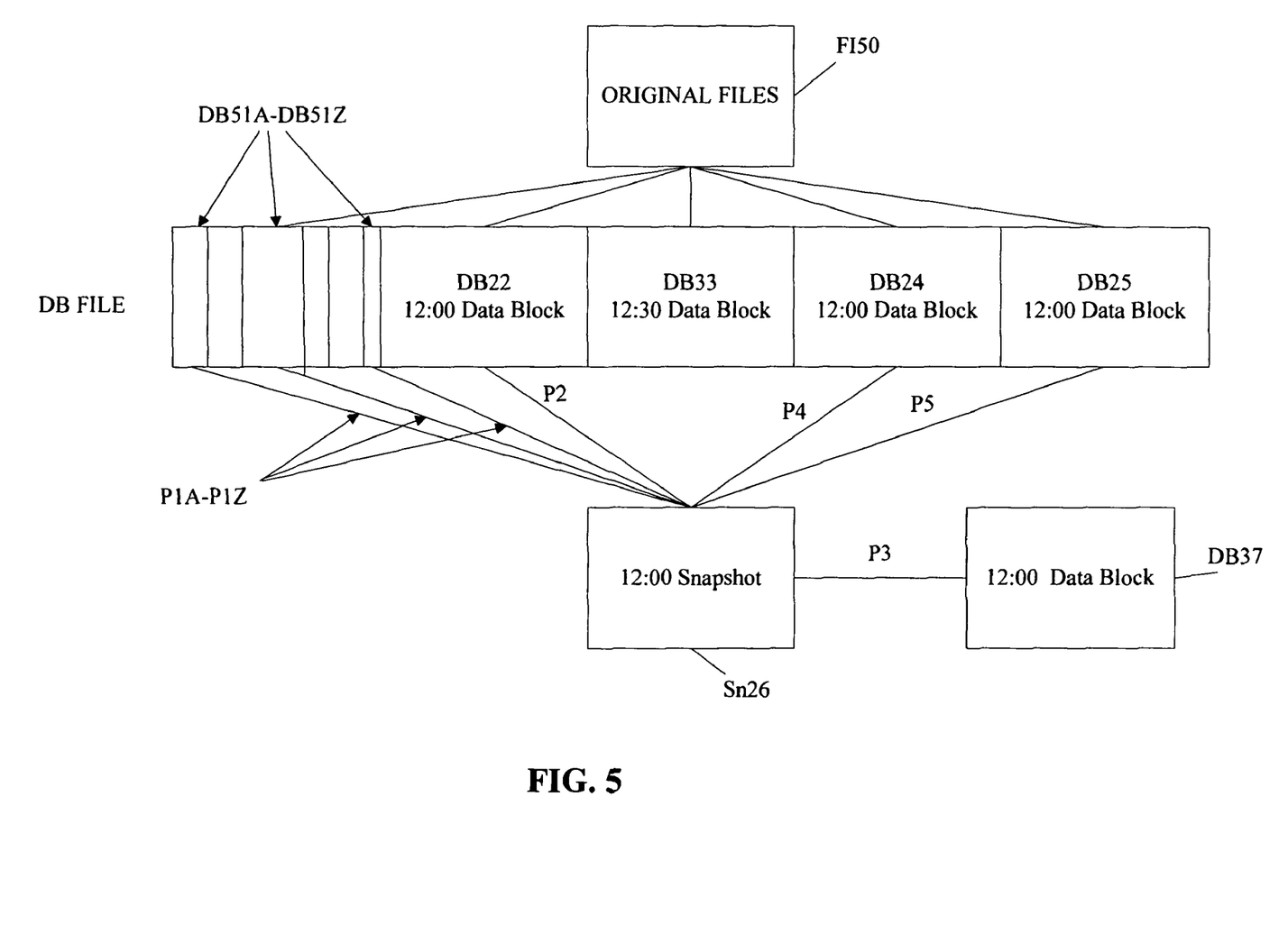
FIG. 5 is a block diagram of one embodiment of a data storage system incorporating features of the present invention where a file is divided into ranges of bytes.

Another example is illustrated with respect to FIGS. 2 and 5. A snapshot 26 is taken of the original file system 20 as of 12:00, and the backup commences. At 12:30 a change is attempted to be made to file 23 of FIG. 2. Before any "WRITE" operation is enabled, 12:00 data of 23 is copied to a new location 37. The pointer P3 is similarly adjusted so that it now points to the new location of the 12:00 data that original resided in block 23 of FIG. 2. Block 37 of FIG. 5 now holds this 12:30 data.

Referring to FIG. 6, at 1:00, the backup of block 21 of FIG. 2 is complete. The Copy-on-Write functionality for block 21 is disabled. If at 1:15 a WRITE operation occurs with respect to block 21, the 12:00 data is replaced with the 1:15 data, as reflected in block 61 of FIG. 6.

Figure 7:
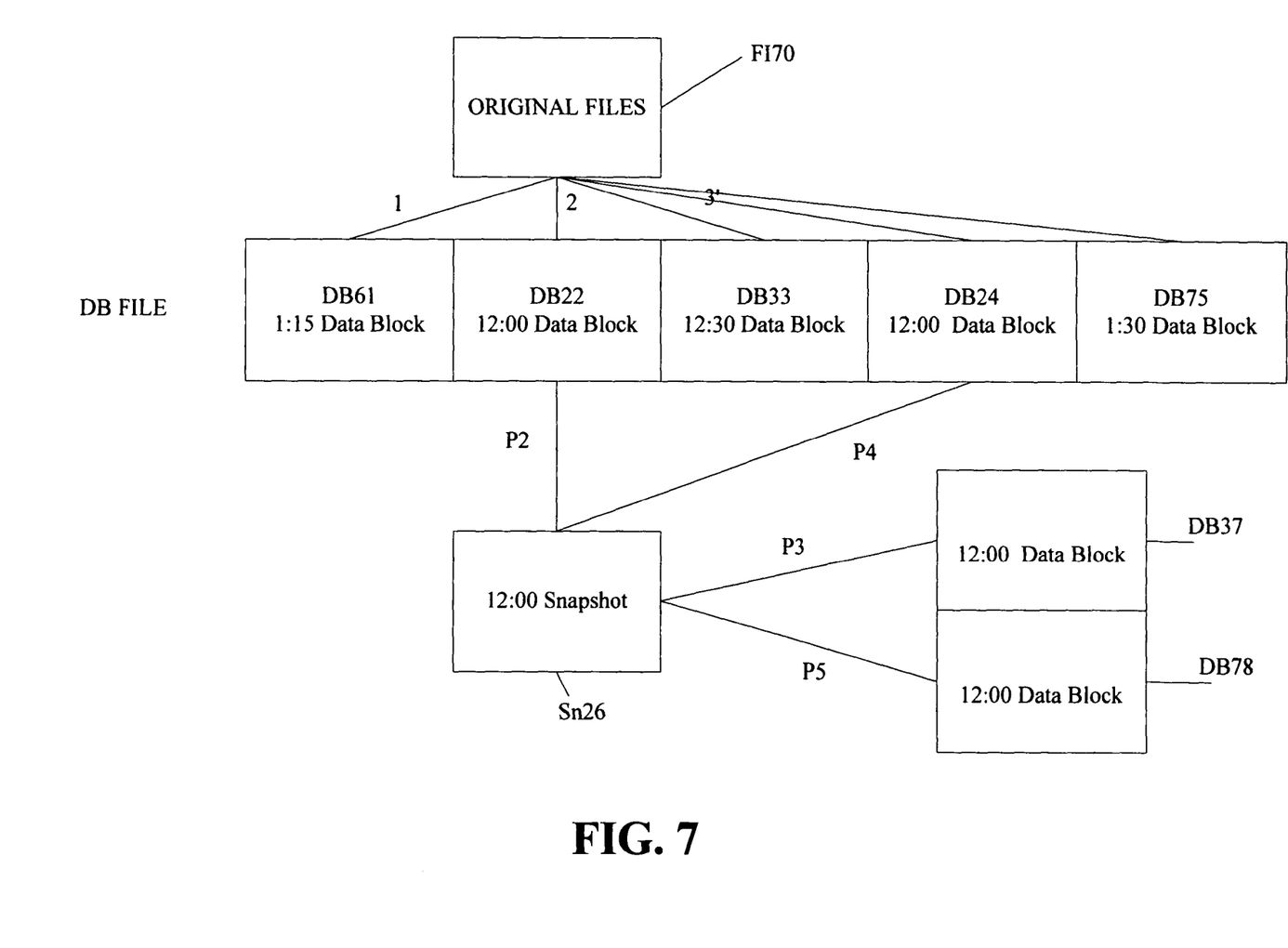
FIG. 7 is a block diagram of another embodiment of a system incorporating features of the present invention illustrating changes while copy-on-write functionality is both enabled for some parts of the system and disabled for other parts.

Referring to FIG. 7, subsequently, but prior to the completion of the backup of block 25, at 1:30, an attempt is made to WRITE to block 25 of FIG. 2. Before the WRITE operation is enabled, the 12:00 data of block 25 is copied to a new location, block 78 in FIG. 7. The pointer P5 is adjusted so that it points to the new location 78 of the 12:00 data. Block 75 will then hold the new 1:30 data that is written.

Figure 8:
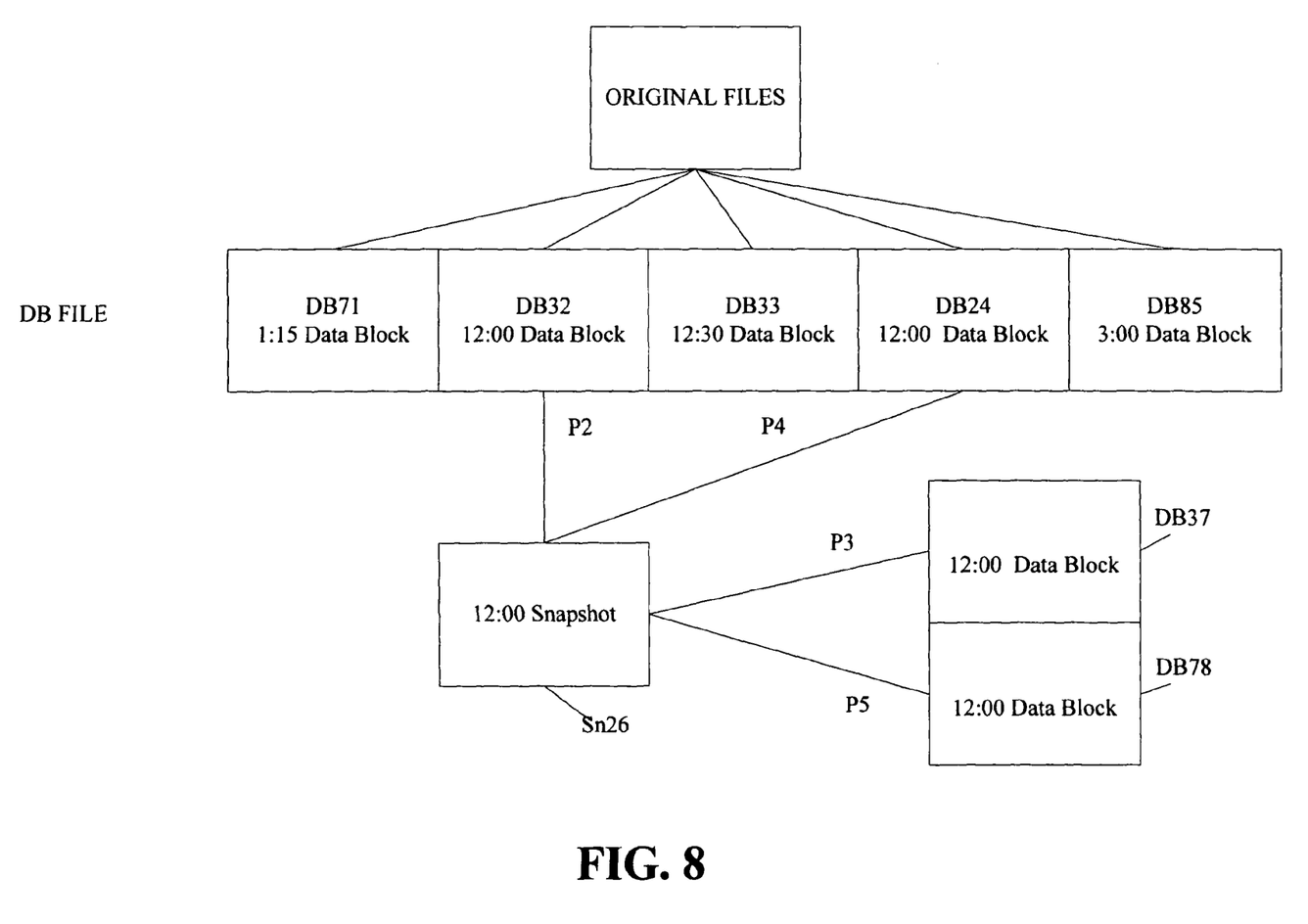
FIG. 8 is a block diagram of another embodiment of a system incorporating features of the present invention after a back-up process has been completed and copy-on-write is disabled.

FIG. 8 illustrates the situation, where the back up of data in block 5 was complete at 2:30. At 3:00, a WRITE operation commences with respect to block 75 of FIG. 7. Since the back up of block 25 is complete and the Copy on Write is disabled, the data in block 75 is replaced with the 3:00 data shown in block 85 of FIG. 8.

As noted above, since files and file systems can be large, the disclosed embodiments can work with smaller ranges of files and file system. For example, referring to FIG. 2, the pointer P1 points to data block 21. The data block 21 can comprise any suitably sized storage facility. For example, in one embodiment, data block 21 may comprise a storage facility with a terabyte magnitude of storage capacity. In alternate embodiments, block 21 can include any size data storage device or facility, other than including a terabyte magnitude of storage capacity. As shown in FIG. 5, the data block 21, or any other file or data block of FIG. 2 can be divided up into one or more blocks or ranges 51A-51Z. Pointers P1A-P1Z are shown between each range or division 51A-51Z and the snapshot 26.

By dividing the data block or file 21 of FIG. 21 into a number of smaller files 51A-51Z, the backup process can backup each smaller file or range of file 51A-51Z. As the backup for each file in the range 51A-51Z is completed, the Copy on Write functionality for the particular completed range can be disabled. Thus, the system does not need to wait for the entirety of a particular block of data or files 21-25 of FIG. 2 to be complete, before being able to disable Copy on Write. The disclosed embodiments eliminate the need to enable Copy-on-Write for the entirety of a particular file. Rather, the backup can be completed with respect to a smaller range, which can be accomplished faster than an entire file, and the copy or write can be disabled with respect to that particular range.

In one embodiment, the present invention allows a range or ranges of data to be backed-up in a priority order. For example, it may be desirable to disable Copy or Write for the most active files as soon as possible during the backup process. The files to be backed-up can be sorted in the order of preference, which in this example, would be the most active file. In alternate embodiments, any suitable ordering or preference can be utilized. As soon as each file, or each designated portion or range thereof, is successfully backed-up the Copy on Write for the completed file or portion thereof is disabled.

In another embodiment it may be desirable to only backup some of the files, subsets of files or ranges of all the original files 20 in a system. This could occur in a testing environment when, for example, a new piece of software is being evaluated, and it is desirable to select files for continued snapshot copy-on-write support, while ignoring all other files. In one embodiment, an application programming interface ("API") can be created where users can select files for continued COW support. Some examples for such an API can include, selection by filename, directory tree, and file name extension. In alternate embodiments, any suitable API can be created. The API allows the user to select only files needed to be active in the snapshot.

Since it may not be possible to perform a limited snapshot of only some of the files in the system, a snapshot is taken of all the files, such as snapshot 26 in FIG. 2. The application programming interface can then selectively turn off the Copy-on-Write functionality for every file except those files where the backup needs to be complete as of a certain point in time before any new changes are written. Thus, the Copy-on-Write functionality is maintained for only those files necessary for the particular testing. As these files are backed up, the Copy on Write can be disabled in accordance with the features of the disclosed embodiments.

Backup processing for very active and very large file systems would realize a significant performance improvement in terms of CPU utilization, reduced IO and reduced disk consumption. Overall file system and system performance would also improve as a result of a more efficient backup process.

Figure 9:
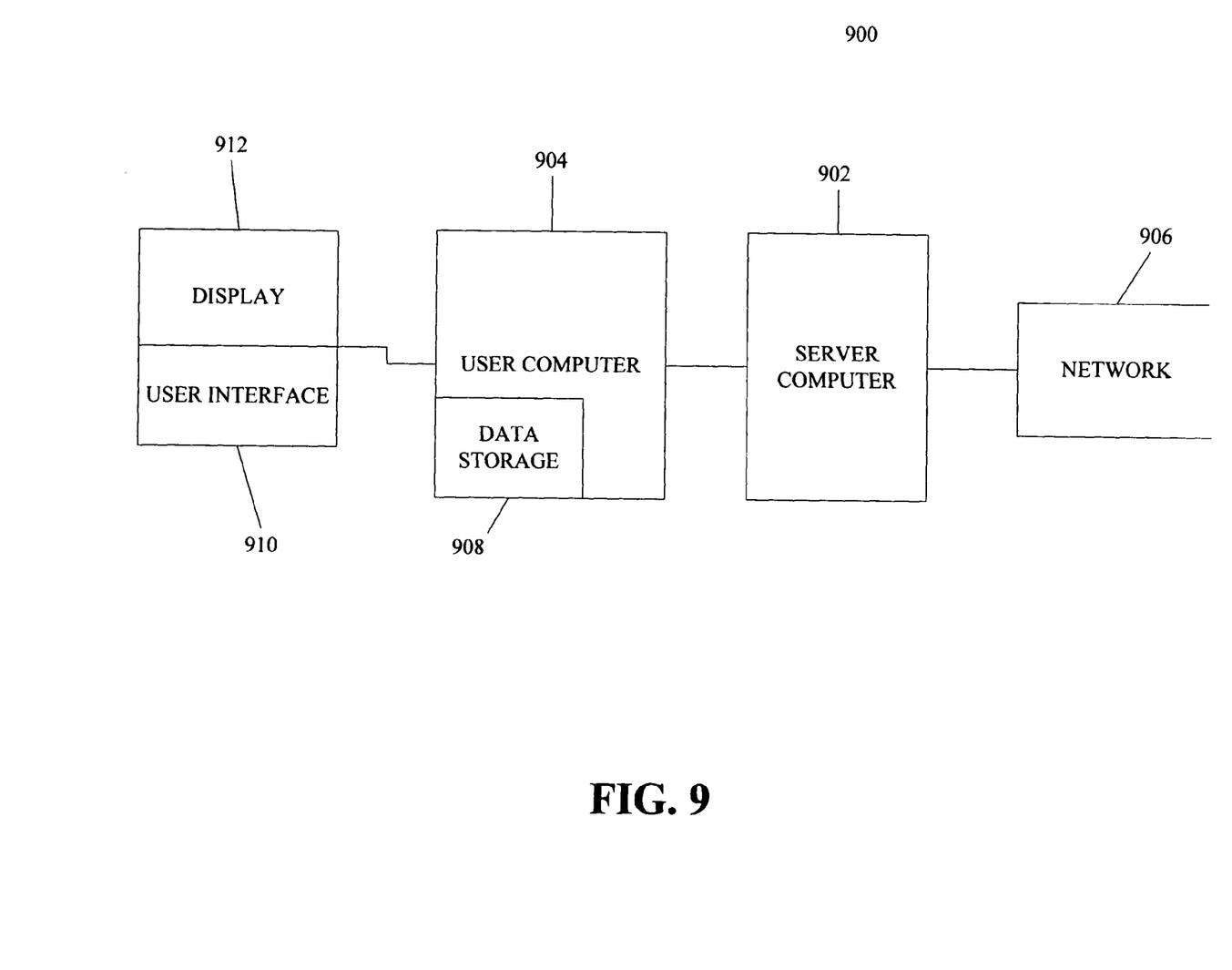
FIG. 9 is a block diagram of one embodiment of a typical architecture that can be used to practice the features of the present invention.

The present invention may also include software and computer programs incorporating the process steps and instructions described above that are executed in different computers. FIG. 9 is a block diagram of one embodiment of a typical apparatus 900 incorporating features of the present invention that may be used to practice the present invention. As shown, a computer system 902 may be linked to another computer system 904, such that the computers 902 and 904 are capable of sending information to each other and receiving information from each other. In one embodiment, computer system 902 could include an origin server or computer adapted to communicate with a network 906, such as for example, the Internet or an Intranet. Computer systems 902 and 904 can be linked together in any conventional manner including a modem, hard wire connection, fiber optic link or such other suitable network connection. Generally, information can be made available to both computer systems 902 and 904 using a communication protocol typically sent over a communication channel or through a dial-up connection on ISDN line. Computers 902 and 904 are generally adapted to utilize program storage devices embodying machine readable program source code which is adapted to cause the computers 902 and 904 to perform the method steps of the present invention. The program storage devices incorporating features of the present invention may be devised, made and used as a component of a machine utilizing optics, magnetic properties and/or electronics to perform the procedures and methods of the present invention. In alternate embodiments, the program storage devices may include magnetic media such as a diskette or computer hard drive, which is readable and executable by a computer. In other alternate embodiments, the program storage devices could include optical disks, read-only-memory ("ROM") floppy disks and semiconductor materials and chips.

Computer systems 902 and 904 may also include a microprocessor for executing stored programs. Computer 902 may include a data storage device 908 on its program storage device for the storage of information and data. The computer program or software incorporating the processes and method steps incorporating features of the present invention may be stored in one or more computers 902 and 904 on an otherwise conventional program storage device. In one embodiment, computers 902 and 904 may include a user interface 910, and a display interface 912 from which features of the present invention can be accessed. The display interface 912 and user interface 910 could be a single interface or comprise separate components and systems. The user interface 908 and the display interface 912 can be adapted to allow the input of queries and commands to the system, as well as present the results of the commands and queries. For example, primary system 12 of FIG. 1 may comprise processor means for executing programmable code means. The processor means may be a microprocessor or other CPU device. The processor means may also comprise various special purpose processors such as digital signal processors and the like. Primary system 12 may also comprise other traditional computer components such as display means for displaying output to a user, input means for inputting data to primary system 12, output means for outputting hard copy printouts, memory means such as RAM, ROM, EEPROM, and the like.

In one embodiment, a computer program product comprises a computer useable medium having computer readable code means embodied therein for causing a computer to reduce copy on write activity during snapshot backup processing. The computer readable code means in the computer program product can comprise computer readable program code means for causing a computer to create a snapshot of a file system; computer readable program code means for causing a computer to disable copy on write processing for each file in the file system when a backup of the file is complete.

Snapshots created for backup purposes are typically deleted once the backup process has completed. Expensive COW operations are usually done to maintain the integrity of the snapshot until the snapshot is deleted. The disclosed embodiments enhance current snapshot technology by allowing applications, such as backup, to disable COW operations on-the-fly for an entire file or a range of bytes within a file. If the application knows it no longer needs a consistent image of the file in the snapshot, perhaps because it has already processed that file, it may wish to disable COW operations for that file, thereby reducing CPU, I/O, and disk space overhead.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method comprising;
    initiating a back up of a plurality of data blocks in a storage device;
    generating a snapshot of metadata corresponding to the plurality of data blocks;
    enabling a copy-on-write functionality for the plurality of data blocks;
    initiating the backup for a first data block from the plurality of data blocks;
    disabling the copy-on-write functionality for the first data block in response to the first data block being backed up while the copy-on-write functionally is maintained for the plurality of data blocks;
    backing up additional data blocks from the plurality of data blocks; and
    disabling the copy-on-write functionality for individual data blocks from the additional data blocks as soon as the individual data blocks are backed up.

2. The method of claim 1 further comprising prior to initiating the backup for the first data block, determining a priority backup order for backing up the plurality of data blocks.

3. The method of claim 2 wherein the priority backup order comprises identifying a range of data within a data block to be backed-up and disabling the copy-on-write functionality for only the range of data within the data block.

4. The method of claim 1 further comprising;
    segregating the first data block into one or more ranges of bytes of data;
    backing up a range from the first data block;
    disabling the copy-on-write functionality for the range when the backup of the range is complete;
    backing up a next range and disabling the copy-on-write functionality for the next range when the back-up of the next range is complete until all ranges in the first data block are backed up.

5. A method of managing data in a data storage system comprising;
    creating a snapshot of a plurality of data blocks in a data storage system as of a predetermined point in time and storing the snapshot in a memory;
    identifying a priority order for the plurality of data blocks in the data storage system;
    enabling a copy-on-write functionality for the plurality of data blocks;
    initiating a data backup process of the data storage system in accordance with the priority order;
    disabling the copy-on-write functionality for an individual data block of the plurality of data blocks in response to completion of the data backup process for the individual data block; and
    generating a backup of the plurality of data blocks in the data storage system.

6. A computer program product comprising:
    a computer useable program storage device having computer readable code means embodied therein for causing a computer to reduce copy on write activity during snapshot backup processing, the computer readable code means in the computer program product comprising:

computer readable program code means for causing a computer to create a snapshot of a file system, the file system comprising a plurality of data files;

computer readable program code means for causing a computer to enable a copy-on-write function for the plurality of data files;

computer readable program code means for causing a computer to initiate a backup for the plurality of data files, the backup comprising:

backing up a first data file;

disabling the copy-on-write functionality for the first data file after the backup of the first data file is complete;

backing up a second data file;

disabling the copy-on-write functionality for the second data file once backup of the second data file is complete; and     continue individually backing up and disabling the copy-on-write functionality for additional data files in the plurality of data files.

7. The computer program product of claim 6, further comprising computer readable program code means for causing a computer to disable the copy-on-write functionality for a range of bytes within an individual data file once the backup of the range of bytes of the individual data file is complete.

8. The computer program product of claim 6, further comprising computer readable program code means for causing a computer to determine a priority order for the plurality of data files to be backed up, the priority order comprising a most active file to a least active file, and backing up the data beginning with the most active file.

9. A non-transitory computer-readable medium containing stored instructions that when executed by a machine cause the machine to perform a method, the method comprising:

initiating a back up of a plurality of data blocks in a storage device;

generating a snapshot of metadata corresponding to the plurality of data blocks;

enabling a copy-on-write functionality for the plurality of data blocks;

initiating the backup for a first data block from the plurality of data blocks;

disabling the copy-on-write functionality for the first data block in response to the first data block being backed up while the copy-on-write functionally is maintained for the plurality of data blocks;

backing up additional data blocks from the plurality of data blocks; and     disabling the copy-on-write functionality for individual data blocks from the additional data blocks as soon as the individual data blocks are backed up.

10. A non-transitory computer-readable medium containing stored instructions that when executed by a machine cause the machine to perform a method, the method comprising:

creating a snapshot of a plurality of data blocks in a data storage system as of a predetermined point in time and storing the snapshot in a memory;

identifying a priority order for the plurality of data blocks in the data storage system;

enabling a copy-on-write functionality for the plurality of data blocks;

initiating a data backup process of the data storage system in accordance with the priority;

disabling the copy-on-write functionality for an individual data block of the plurality of data blocks in response to completion of the data backup process for the individual data block; and     generating a backup of the plurality of data blocks in the data storage system.

11. A non-transitory computer-readable medium containing stored instructions that when executed by a computer cause the computer to perform a method, the method comprising:

causing the computer to reduce copy on write activity during snapshot backup processing, comprising:

causing the computer to create a snapshot of a file system, the file system comprising a plurality of data files;

causing the computer to enable a copy-on-write function for the plurality of data files;

causing the computer to initiate a backup for the plurality of data files, the backup comprising:

backing up a first data file;

disabling the copy-on-write functionality for the first data file after the backup of the first data file is complete;

backing up a second data file;

disabling the copy-on-write functionality for the second data file once backup of the second data file is complete; and             continue individually backing up and disabling the copy-on-write functionality for additional data files in the plurality of data files.

\* \* \* \* \*

UNITED STATES PATENT AND TRADEMARK OFFICE
CERTIFICATE OF CORRECTION

| | | |
|---|---|---|
| PATENT NO. | : 7,774,316 B2 | Page 1 of 1 |
| APPLICATION NO. | : 11/292095 | |
| DATED | : August 10, 2010 | |
| INVENTOR(S) | : Robert Breau et al. | |

It is certified that error appears in the above-identified patent and that said Letters Patent is hereby corrected as shown below:

On the Title page, in field (22), in column 1, line 1, delete "Dec. 2, 2005" and insert -- Nov. 30, 2005 --, therefor.

In column 1, line 39, delete "10" and insert -- IO --, therefor.

In column 8, line 12, in claim 1, delete "comprising;" and insert -- comprising: --, therefor.

In column 8, line 37, in claim 4, delete "comprising;" and insert -- comprising: --, therefor.

In column 8, line 48, in claim 5, delete "comprising;" and insert -- comprising: --, therefor.

Signed and Sealed this
Twenty-fourth Day of May, 2011

David J. Kappos
*Director of the United States Patent and Trademark Office*